United States Patent [19]

Hisano et al.

[11] Patent Number: 5,241,640

[45] Date of Patent: Aug. 31, 1993

[54] DISK UNIT WITH PROCESSORS WHICH DETECT CACHE STATUS AND CONTROL PORT SELECTION FOR OPTIMIZING UTILIZATION OF CACHE INTERFACING HOST AND EXTERNAL MEMORY

[75] Inventors: Kiyoshi Hisano, Odawara; Ken Hirashima, Minamiashigara; Hiroyuki Kurosawa, Hiratsuka; Kenji Kubota; Shuji Sugimoto, both of Odawara, all of Japan

[73] Assignee: Hitachi, Ltd., Tokyo, Japan

[21] Appl. No.: 418,659

[22] Filed: Oct. 10, 1989

[30] Foreign Application Priority Data

Oct. 12, 1988 [JP] Japan .................. 63-256504

[51] Int. Cl.$^5$ ............................................. G06F 13/12
[52] U.S. Cl. ................... 395/425; 364/248.1; 364/260; 364/238.4; 364/243.4; 364/DIG. 1
[58] Field of Search ............ 395/425, 325; 370/85.9, 370/85.13

[56] References Cited

U.S. PATENT DOCUMENTS

| | | | |
|---|---|---|---|
| 4,603,380 | 7/1986 | Easton | 395/425 |
| 4,916,605 | 4/1990 | Beardsley | 395/425 |
| 4,920,478 | 4/1990 | Furhya | 395/425 |
| 4,930,066 | 5/1990 | Yokota | 395/425 |
| 4,951,246 | 8/1990 | Fromm | 395/425 |
| 4,972,364 | 11/1990 | Baurett | 395/425 |
| 4,974,156 | 11/1990 | Harding | 395/425 |
| 5,060,145 | 10/1991 | Scheuneman | 395/425 |
| 5,072,420 | 12/1991 | Conley | 395/425 |

FOREIGN PATENT DOCUMENTS 59-100964 6/1984 Japan .

*Primary Examiner*—Robert B. Harrell
*Assistant Examiner*—Eric Coleman
*Attorney, Agent, or Firm*—Fay, Sharpe, Beall, Fagan, Minich & McKee

[57] ABSTRACT

A disk unit control apparatus (DKC) comprises a cache memory provided between a CPU and an external memory (DKU) storing the information exchanged with the CPU, the cache memory holding temporarily copies of the information stored in the DKU. A request from the CPU for access to the information stored in the DKU is met as far as possible by use of the information held in the cache memory. First transfer routes of information between the CPU and the cache memory is greater in number than second transfer routes of information between the cache memory and the DKU. This makes it possible that even when direct accesses to the DKU in the same number as the second transfer routes occur in each of the first transfer route, acesses to the cache memory which may arise from other CPUs are capable of being effected through the remaining ones of the first transfer routes. As a result, a cache memory accessible with high speed is obtained, and the utilization efficiency of the data stored in the cache memory is substantially improved, improving the data throughput between the CPU and the DKU.

3 Claims, 5 Drawing Sheets

DISK UNIT WITH PROCESSORS WHICH DETECT CACHE STATUS AND CONTROL PORT SELECTION FOR OPTIMIZING UTILIZATION OF CACHE INTERFACING HOST AND EXTERNAL MEMORY

BACKGROUND OF THE INVENTION

The present invention relates to a control apparatus for an external memory and an information processing system, and more in particular to a control apparatus (abbreviated as "DKC") carrying a cache memory for an external memory like a disk unit (abbreviated as "DKU").

In recently-developed computer systems, a memory in the central processing unit (CPU) such as a cache memory has an access time as high in speed as several nanoseconds (ns) to several tens of nanoseconds, and a main storage (MS) in the CPU several tens of ns to one hundred and several tens of ns. Further, the processing speed of the central processing unit is in the order of picoseconds (ps) in terms of the gate delay time of a large-scale logic integrated circuit constituting the central processing unit.

In a magnetic disk unit or the like which is a kind of DASD (Direct Access Storage Device) connected to a high-speed central processing unit and playing an important role especially as an external memory for storing a large amount of data, on the other hand, the access time is approximately several tens of ms (milliseconds) at most in view of the mechanical operations such as head seeking and the rotational delay (time) of the magnetic disk providing a storage. The data transfer speed of this device, which is several hundred ns per byte, is also low as compared with that of the central processing unit, so that the amount of data exchangeable per unit time is limited. This limitation in data throughput makes up a great bottleneck for improving the processing capacity of the computer system as a whole.

Generally, a great amount of data stored in an external memory has a comparatively narrow range accessible from the central processing unit within a predetermined time. In other words, it has a local reference characteristic.

In view of this, the prior art as disclosed in JP-A-59-100964 is well known, in which a cache memory is provided on an external memory control unit arranged on the central processing unit side between a plurality of channels and an external memory such as a magnetic disk unit for controlling inputs to and outputs from external units in place of the central processing unit. This cache memory includes a semiconductor memory or the like accessible at a speed higher than the magnetic disk unit. Among the data stored in the magnetic disk unit, those ones expected to have a high probability of access are copied in the cache memory from time to time, and a request for access to the data in the magnetic disk unit from a channel is met with high speed by using the data copied in the cache memory as far as possible (at about 70% to 80% in cache hit rate). The chances of direct access to the external memory having a large access time from a channel are thus reduced, thereby improving the processing capacity, that is, throughput of the whole system.

In the aforementioned prior art system, the external memory control unit is provided with a function of performing data exchange in parallel fashion both between a plurality of channels and a cache memory and between a cache memory and an external memory. The control function of the external memory control unit permits data exchange between the channels and the external memory in the case where the data exchange between the channels and the cache memory competes with that between the cache memory and the external memory.

The above-mentioned prior art system fails to take into consideration the number of data transfer routes between the channels and the cache memory and between the cache memory and the external memory, both of which have the same number of routes. If the data required for access in each of data transfer routes or passages between the channels and the cache memory happens to be lacking in the cache memory by what is called a "cache miss" and the need arises for direct access to the external memory, therefore, all the data transfer routes on the channel side come to be connected to the data transfer routes on the external memory side, and are thus entirely occupied in what is called the busy state between DKC and DKU. Under this condition, even if a request arises from another channel for access to the data in the cache memory, the external memory is incapable of receiving the request, thus posing the problem of the cache memory being not utilized effectively.

This means that a central processing unit is required to wait before a request for access to the data in the external memory is met, with the result that the data throughput between the channels and the external memory is reduced, thereby contributing to a reduced performance of the computer system as a whole.

SUMMARY OF THE INVENTION

Accordingly, it is an object of the present invention to provide an external memory control technique capable of improving the throughput of data between a hierarchically upper processing unit such as a host processor and an external memory by improving the utilization efficiency of a cache memory of a control unit provided between the host processing unit and the external memory.

Another object of the present invention is to provide an information processing system capable of improving the data processing capacity of the whole system by reducing the waiting time in access from a host processing unit to an external memory.

In order to achieve the aforementioned objects, according to one aspect of the invention, there is provided an external memory control apparatus comprising a cache memory provided between a hierarchically upper processing unit and an external memory for storing data exchanged with the processing unit, the cache memory temporarily holding copies of the data stored in the external memory, wherein a request from the processing unit for access to the data stored in the external memory is met by use of the data held in the cache memory as far as possible, and also the number of first transfer routes between the processing unit and the cache memory is greater than that of second transfer routes between the cache memory and the external memory.

According to another aspect of the invention, there is provided an information processing system comprising an upper processing unit such as a CPU including a main memory, an external memory for storing the data exchanged with the upper processing unit, a cache memory interposed between the processing unit and the external memory for temporarily holding copies of the data stored in the external memory, and a control apparatus operated to respond to a request from the processing unit for access to the data stored in the external memory, by use of the data held in the cache memory as far as possible, wherein the number of first transfer routes between the processing unit and the cache memory is greater than that of second transfer routes between the cache memory and the external memory.

According to the above-described control apparatus according to the present invention, even in the case where as many direct accesses to the external memory as the second transfer routes occur in a given first transfer route, other accesses from the processing unit to the cache memory are realized parallelly through the remaining first transfer routes. As a result, a cache memory accessible at high speed is obtained and the utilization efficiency of the data stored in the cache memory is substantially improved, thereby leading to an improved throughput of data between the upper processing unit and the external memory.

The information processing system according to the present invention permits, in parallel fashion, both the access to at least one data in the cache memory through a first transfer route from a given upper processing unit and the access from another upper processing unit to the cache memory or direct access to the external memory. The waiting time before an access request to the external memory from each upper processing unit is met thus decreases, thereby improving the processing capacity of the information processing system as a whole.

DESCRIPTION OF THE PREFERRED EMBODIMENTS

An embodiment of the present invention will be described in detail below with reference to the accompanying drawings.

Figure 1:
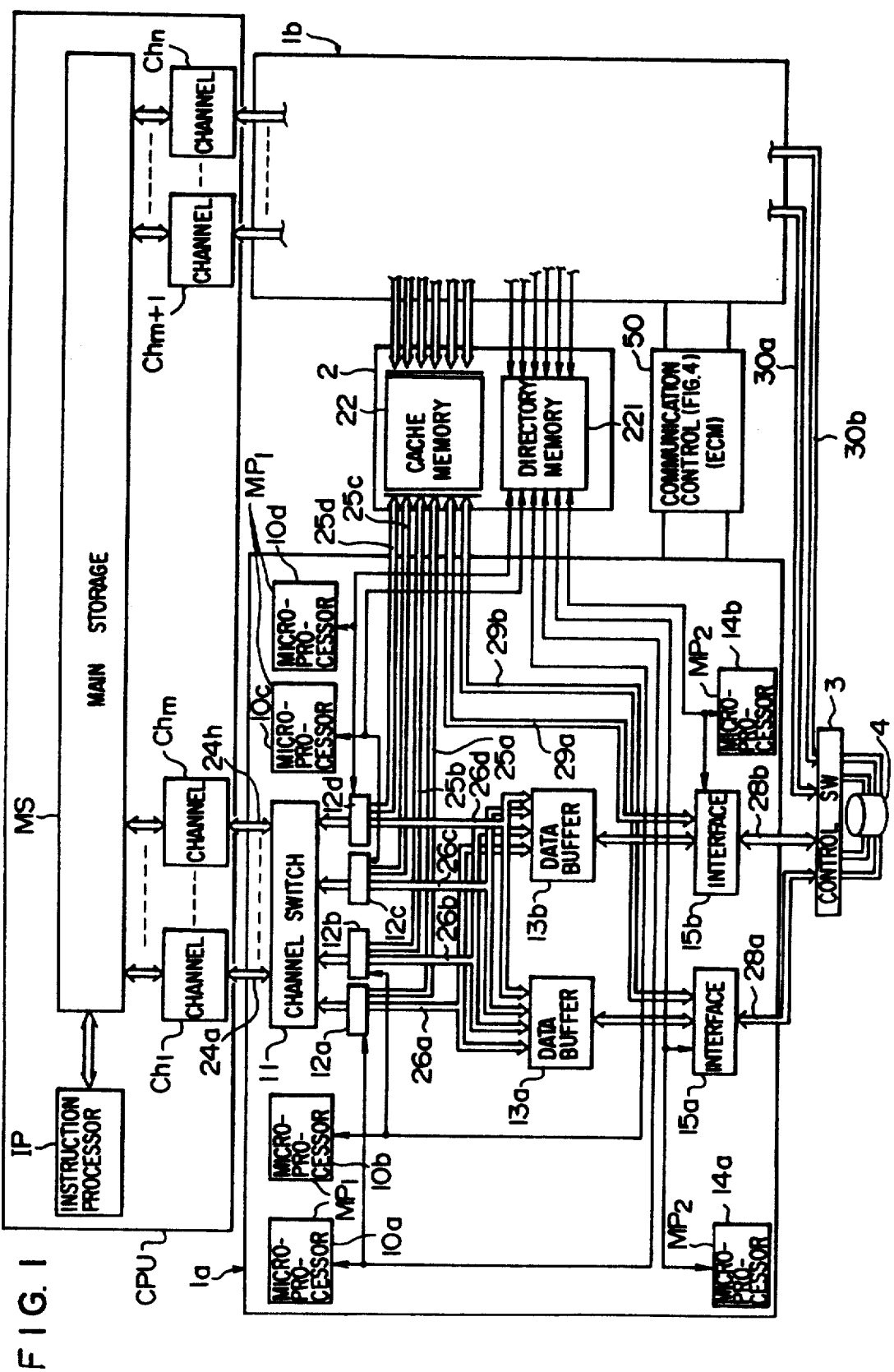
FIG. 1 is a block diagram showing a configuration of an information processing system according to an embodiment of the present invention.

A block diagram of a configuration of an information processing system according to an embodiment of the present invention is shown in FIG. 1.

An information processing system according to this embodiment comprises a central processing unit CPU, a main storage MS storing a program for controlling the operation of an instruction processing unit IP and data to be processed, a plurality of channels $Ch_1, Ch_2, \ldots, Ch_n$ (host processing units) for controlling data inputs and outputs between the main storage MS and external units in place of the instruction processing unit IP, magnetic disk unit 4 (external memory DKU) for storing the data exchanged with a channel Ch, a cluster 1a and a cluster 1b making up a plurality of control units interposed between a plurality of channels $Ch_1, \ldots, Ch_n$ and the magnetic disk units 4 and operated to control the exchange of control data and other data between the channels and the magnetic disk units, and a cache memory unit 2 connected through the clusters 1a and 1b to host channels $Ch_1, Ch_2,$ so on, and subordinate magnetic disk units 4. The DKU 4 includes, for example, five 5G-byte disk driver units and has a storage capacity of 40G bytes.

The cache memory unit 2 is configured of a cache memory 22 and a directory memory 221. The cache memory 22 is for storing copies of the data stored in the magnetic disk units 4 in a format equivalent to the data in the internal storage of the magnetic disk units 4, for example, in a format including a count section, a key section and a data section. In the cache memory 22, for example, a memory having a width of 16-byte bus is coupled to four 4-byte buffers, each output of which is controlled by a microprocessor or the like.

The directory memory 221 is for controlling, on the basis of the well-known LRU (Least Recently Used) rule, the information on the position where the data in the cache memory 22 is stored within the magnetic disk units 4 (cylinder number or head number), and the information indicating the the addresses corresponding to the storage positions in the cache memory 22. In order to use the cache memory 22 efficiently, the directory memory 221 also controls the storage of new data in the cache memory 22 from the magnetic disk units 4 and the removal of the data already stored in the cache memory 22.

The clusters 1a and 1b interposed between a plurality of channels $Ch_1, Ch_2, \ldots, Ch_n$ and the magnetic disk units 4 are connected to the particular channels Ch respectively through a plurality of channel paths 24a to 24h, and also to the subordinate magnetic disk units 4 through a couple of control paths 28a, 28b (second transfer routes) and control paths 30a, 30b (second transfer routes) respectively.

In the case of the present embodiment, the clusters 1a and 1b have the same configuration and function, and therefore the following explanation will be centered on the cluster 1a in order to avoid duplication.

The two control paths 28a and 28b of the cluster 1a connected with the magnetic disk units 4 are also connected to a plurality of buffers 13a and 13b through control interface control units 15a and 15b.

The control interface control units 15a and 15b are in turn connected to the cache memory 22 of the cache memory unit 2 through two cache subordinate paths 29a and 29b (second transfer routes).

Further, the control interface control units 15a and 15b are controlled independently of each other by microprocessors 14a and 14b for controlling the magnetic disk units 4 and the cache memory unit 2, thus switching from time to time the connection of the magnetic disk units 4 to a plurality of data buffers 13a, 13b and the cache memory 22.

On the other hand, a control switch 3 for performing such operations as selection of a specific magnetic disk unit 4 is provided on the route of the control paths 28a, 28b and 30a, 30b leading from the clusters 1a, 1b to the magnetic disk units 4.

According to the present embodiment, a plurality of channel paths 24a to 24h for connecting the cluster 1a to the host channels Ch are connectable to either the data buffer 13a or 13b through the channel switch unit 11 and paths 26a to 26d connected with four channel ports 12a, 12b, 12c and 12d (first transfer routes).

Further, the four channel ports 12a to 12d are connected separately to the cache memory 22 via four cache upper paths 25a, 25b, 25c and 25d (first transfer routes).

The four channel ports 12a to 12d are controlled independently of each other mainly by a plurality of microprocessors 10a, 10b, 10c, 10d for controlling the cache memory unit 2 and the channel paths 24a to 24h, so that the connections to the data buffers 13a, 13b or the cache memory 22, of the channel paths 24a to 24h connected to the channel ports 12a to 12d through the channel switch 11, are adapted to be switched as desired.

Figure 2:
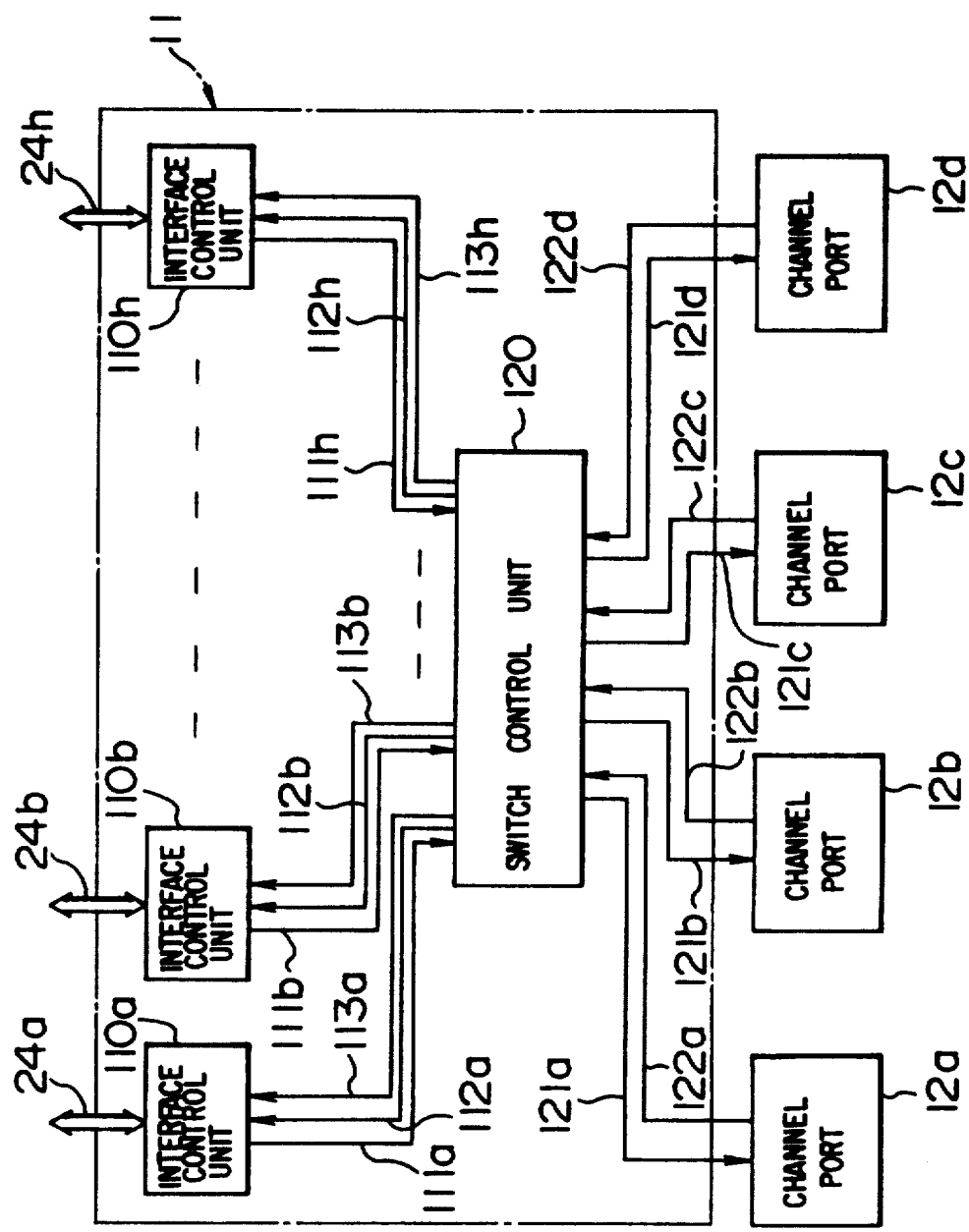
FIG. 2 is a block diagram showing a part of the configuration more in detail.

A detailed view of the channel switch unit 11 is shown in FIG. 2. The configuration shown in FIG. 2 includes interface control units 110a to 110h for controlling a plurality of channel paths 24a to 24h separately, and a switch control unit 120 for controlling the connection between a plurality of interface control units 110a to 110h and a plurality of channel ports 12a to 12d.

In response to a start-accepting signal 111a issued from the interface control units 110a to 110h at the time of arrival of an access request issued to the channel paths 24a to 24h from the host channel Ch, the switch control unit 120 checks PRT FREE (port free) signals 122a to 122d produced from a plurality and channel ports 12a to 12d indicating that a particular channel port is usable, and if a particular channel port is found connectable, operates to respond by producing ACT (active) signals 112a to 112h, while if all the channel ports are unconnectable, BUSY signals 113a to 113h are provided for response. At the same time, the switch control unit 120 supplies the selected channel ports 12a to 12d with PRT SEL (port select) signals 121a to 121d indicating the occupied state of a particular channel.

Figure 3:
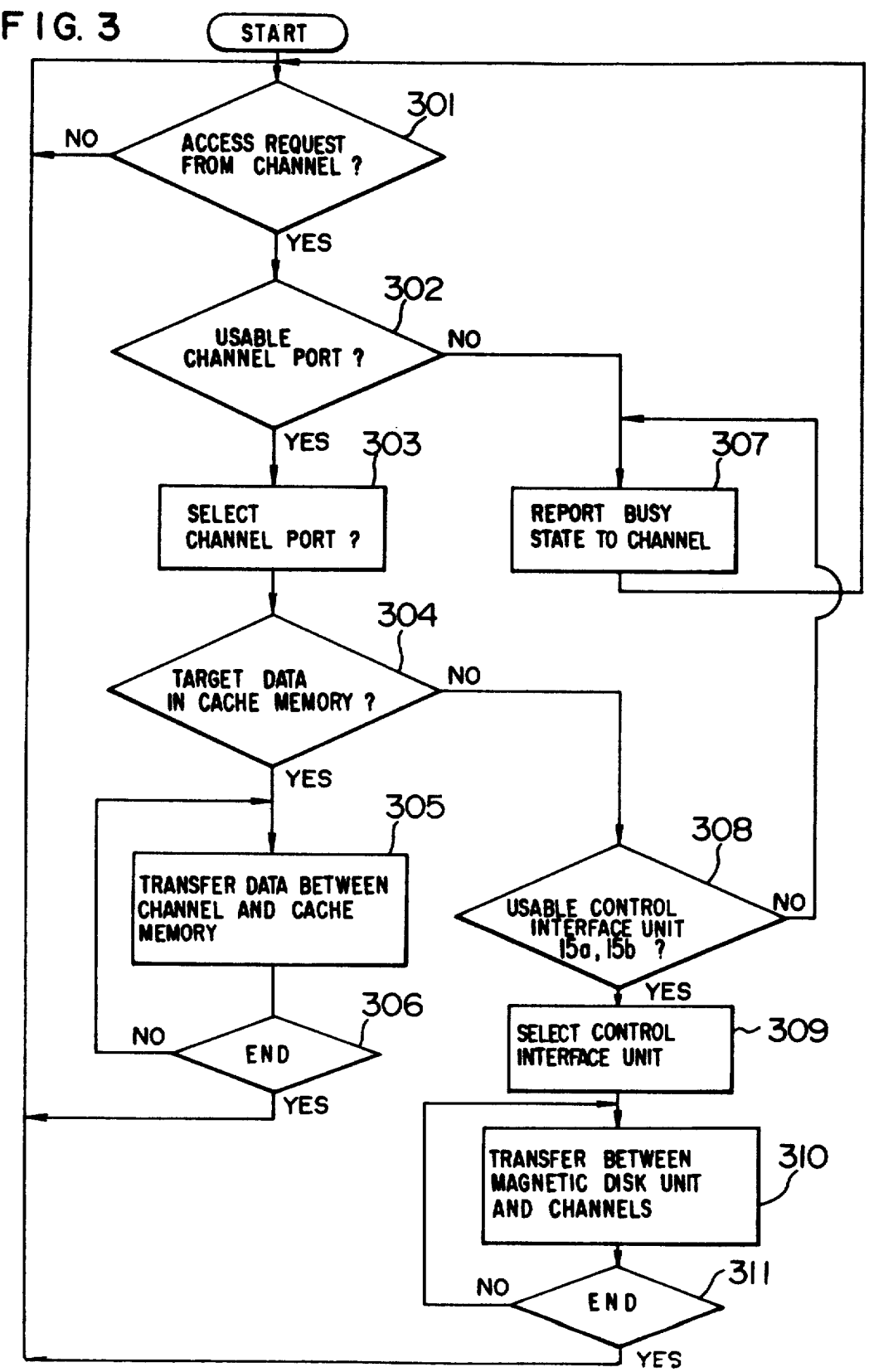
FIG. 3 is a flowchart showing an example of operation of the information processing system according to an embodiment of the present invention.

Now, the operation of an information processing system according to the embodiment under consideration will be explained with reference to the flowchart of FIG. 3.

First, the channel switch 11 checks for a request for access to the channel paths 24a to 24h from a plurality of channels Ch (step 301). The interface control units 110a to 110h of the channel switch 11, upon receipt of an access request issued to the channel paths 24a to 24h, turn on the start-accepting signals 111a to 111h for the switch control unit 120.

With this signal as a momentum, the switch control unit 120, in order to select one of the channel ports 12a to 12d, checks the states of the PRT FREE signals 122a to 122d produced from the channel ports 12a to 12d and make sure whether there is any channel port usable (step 302).

If there is any channel port usable with the PRT FREE signals 122a to 122d on, one of them is selected and one of the PRT SEL signals 121a to 121d corresponding to the selected port is turned on. Further, one of the ACT signals 112a to 112h corresponding to the interface control units 110a to 110h that have received an access request is turned on (step 303).

In the event that all the channel ports 12a to 12d are busy (occupied) at step 302, on the other hand, the switch control unit 120 turns on the BUSY signals 113a to 113h corresponding to the interface control units 110a to 110h that have received the access request and thus reports that an access required from channel side is rejected (step 307). The process then is returned to step 301.

Upon selection of one of the channel ports 12a to 12d in this way, one of the microprocessors 10a to 10d corresponding to the selected channel port decodes a command instructing the reading or writing of a target data for the magnetic disk units arriving from a channel Ch, and checks to see whether the data destined by the access request is stored in the cache memory 22 (step 304).

This operation is realized by searching the directory memory 221 on the basis of the information on the target data storage position (cylinder number and head number) in the magnetic disk units 4 and the like, which information accompanies the command as a parameter arriving from the channel Ch.

In the case where the target data exists in the cache memory 22 (in what is called a cache hit), high-speed data transfer is executed between the cache memory 22 and the channel Ch through one of the channel ports 12a to 12h selected in the manner mentioned above and the channel switch unit 11, followed by return to the process of step 301.

If there is not any target data found in the cache memory 22 (in what is called a "cache miss"), by contrast, the control interface control units 15a and 15b are checked for availability (step 308).

This operation is performed by cooperation between the microprocessors 10a to 10d controlling the channel ports 12a to 12d and the microprocessors 14a and 14b controlling the control interface units 15a and 15b through an interface not shown.

Specifically, the microprocessors 10a to 10d, referring to the status register of the microprocessors 14a, 14b for example, decides whether the control interface units 15a and 15b are usable.

If there is any usable control interface unit 15a or 15b, the particular unit is selected (step 309) and the data associated with the access request is transferred between the channel Ch and the magnetic disk units 4 through the channel switch unit 11, selected one of the channel ports 12a to 12d, the data buffer 13a or 13b and the control interface unit 15a or 15b (steps 310 and 311), followed by return to step 301.

In this case, the microprocessors 10a to 10d are synchronized with the microprocessors 14a and 14b through the aforementioned interface not shown to execute the data transfer.

If both the control interface units 15a and 15b are busy at step 308, the microprocessors 10a to 10d turn off the PRT FREE signals 122a to 122d of the channel ports 12a to 12d, and the switch control unit 120 turns on the BUSY signals 113a to 113h for the interface units 110a to 110h. The associated one of the interface units 110a to 110h that has detected this status reports the rejection of an access request to the channel Ch (BUSY) at step 307, followed by returning to step 301.

The control interface units 15a and 15b are busy on two occasions.

On one of the occasions, direct access is made from the channel Ch to the magnetic disk units 4 through the channel ports 12a to 12d and the data buffers 13a and 13b. In this case, one of the channel ports 12a to 12d is connected with one of the control interface control units 15a and 15b.

The other occasion is when a data is transferred between the cache memory 22 and the magnetic disk units 4. This specifically includes the case in which the data written in the cache memory 22 is rewritten actually at a predetermined position of the magnetic disk units 4 or the case in which a part of the data stored in the magnetic disk units 4 is read in advance in preparation for a future access request and is copies in the cache memory 22. In either case, the channel ports 12a to 12d are not connected with the control interface units 15a and 15b.

Figure 4:
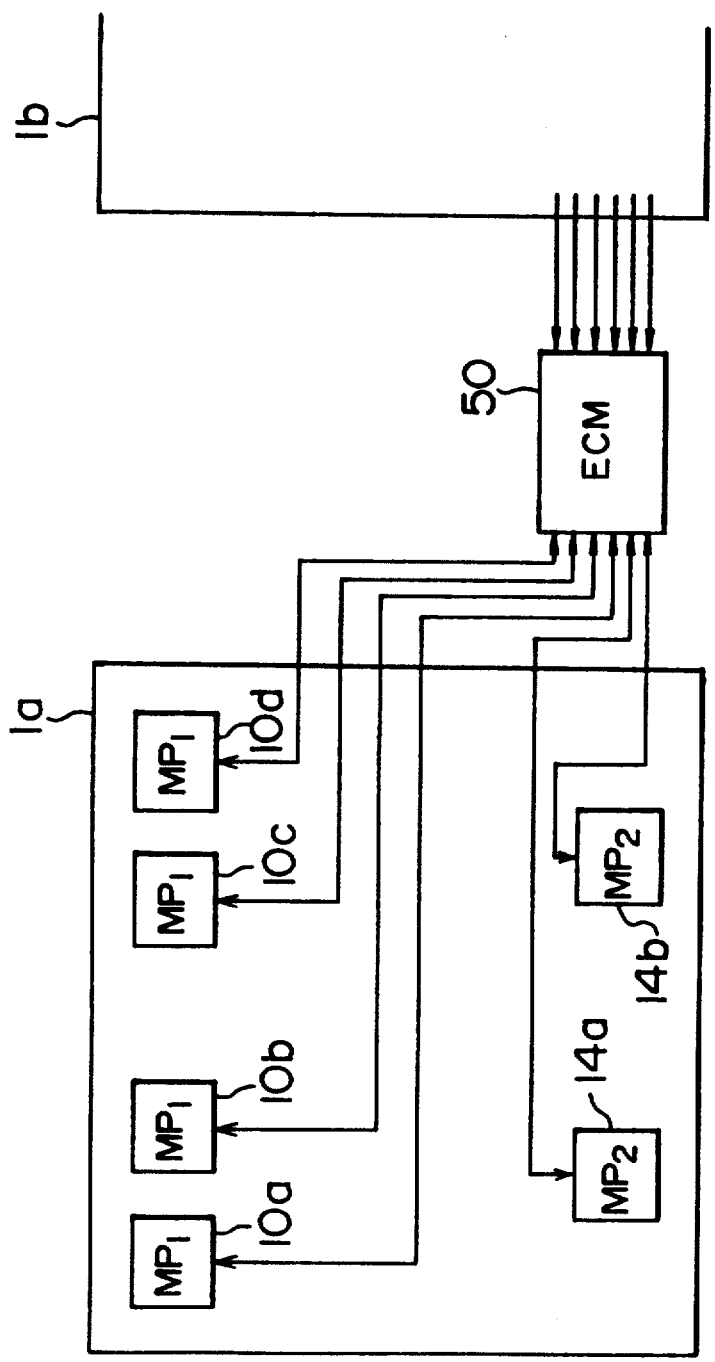
FIG. 4 is a block diagram showing a general configuration of a communication circuit including an extended control memory for controlling the communications between microprocessors of a control apparatus.
Figure 5:
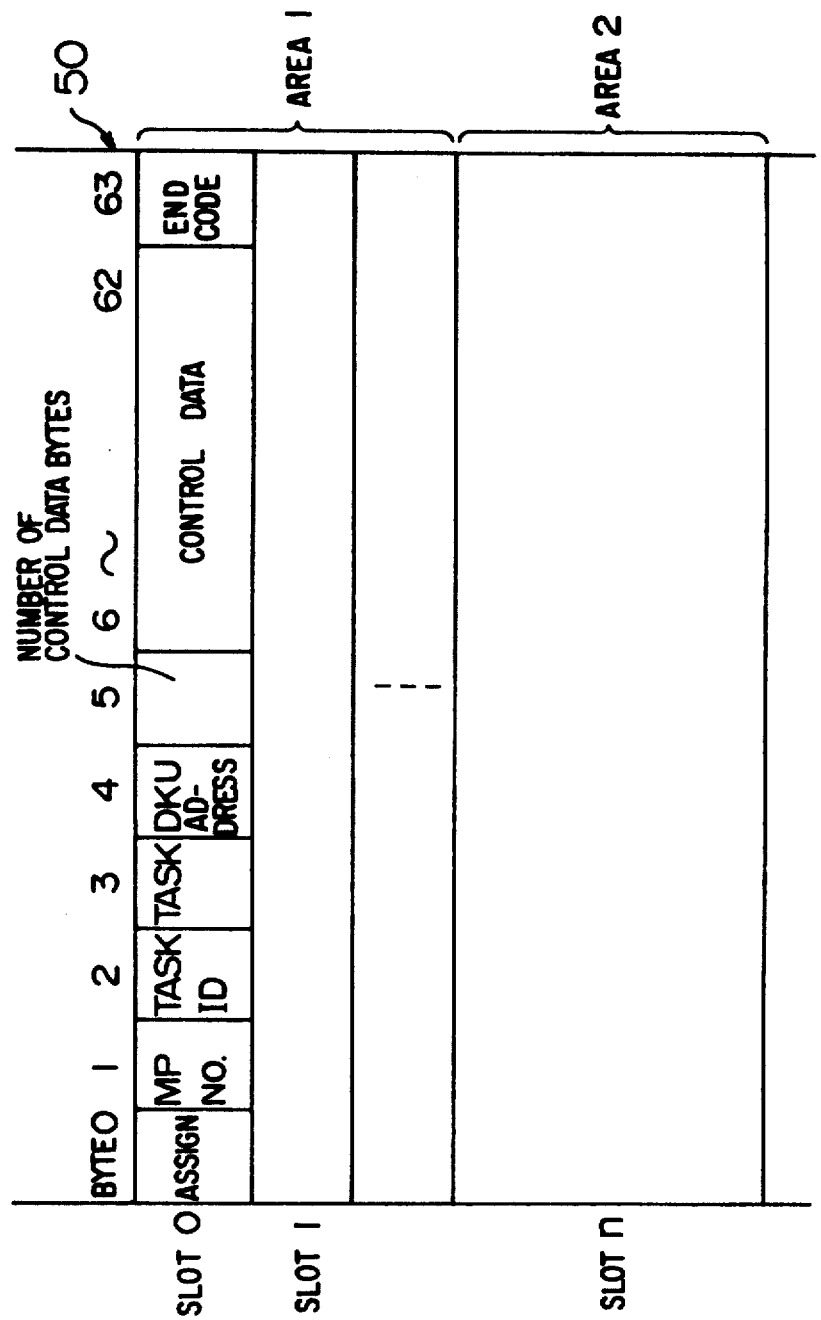
FIG. 5 is a diagram showing in format an example of data stored in the extended control memory shown in FIG. 4.

The communication control between the microprocessors 10a to 10d and 14a to 14b will be explained with reference to FIGS. 4 and 5.

Communications between the microprocessors (MP1) 10a to 10d used mainly for channel control and the microprocessors (MP2) 14a and 14b having the main purpose of DKU control are effected through an extended control memory (ECM) 50. FIG. 4 shows an arrangement of ECM 50, which includes a memory accessible by the MPIs 10a to 10d and 14a to 14b and a function as a supervisor permitting exclusive control for each path. Areas 1 and 2 in FIG. 5 are used for the communications between the MP1s 10a to 10d and MP2s 14a and 14b. The area 1 is for communications from MP1 to MP2, and the area 2 from MP2 to MP1. Each of the areas 1 and 2 is divided into slots of 64 bytes. Each slot has stored therein the data in the format shown in FIG. 5. Each data of the area 1 will be explained below.

ASSIGN (byte 0)
(FF): Indicates that a slot is vacant.
(00): Indicates that a slot is registered but any mating MP2 is not determined.
(MP2*): An MP2 number for processing a slot is determined and stored.
Ex: MP2 14a ... 01
MP2 14b ... 02
MP NO. (byte 1)
The MP1 number with which a slot is registered is stored.
Ex: MP1 10a ... 01
MP1 10b ... 02
TASK ID (byte 2)
Identification (ID) number of the processing (task) registered for a slot. Generally, a task-accepting number within each MP1.
TASK (byte 3)
A code of the task to be processed is stored.
Ex: SEEK ... (07)
DKU ADDRESS (byte 4)
A DKU address targeted by task
NUMBER OF CONTROL DATA BYTES (byte 5)
Number of bytes for effective data among the control data ranging from 6 bytes to 62 bytes
CONTROL DATA (byte 6 to byte 63)
Control data for the task is stored.
Ex: When the task is "SEEK", the cylinder number and the head number to be sought are stored.
END CODE (byte 63)
Indicates that the processing of the slot has ended. (FF) is stored.

The operation of the ECM 50 will be explained. When the SEEK command is received by the MP1 10a from a channel, the MP1 10a first finds out a vacant slot of ECM (searching for a slot of area 1 where the byte 0 is (FF)). The MP1 10a then sets the byte 0 of a vacant slot to (00), indicating that the particular slot is registered but any mating MP2 is not determined. (01) is stored as MP No. indicating that the MP where the particular slot is registered is MP1. TASK ID, which provides the control number of the task in MP 10a, is stored as a task-accepting number. The type of task to be processed, that is, the code (07) of the SEEK command is stored in TASK. A target logic address of DKU is stored in the DKU address. Since two bytes including the cylinder number and the head number to be sought for are stored as the control data, the number of control data bytes is (2). MP1 registers a slot as mentioned above and either MP2 14a or 14b which has been set free scans the area 1, detects the slot where the ASSIGN byte is (00), and if MP2 14a is involved, stores (01) in the ASSIGN byte. The connection between the MP1 and MP2 is established in this way, thereby processing the SEEK command by MP2 14a. MP1 10a becomes free until the end code becomes (FF) after confirmation that the ASSIGN byte becomes (01), thus readying for receiving a request from a channel for other process such as access to the cache memory.

According to the present embodiment, as described above, the channel ports 12a to 12d and the cache host paths 25a to 25d are packaged in four systems as compared only two systems including the control interface units 15a, 15b and the cache subordinate paths 29a, 29b in each of the clusters 1a and 1b. If an access request from a channel Ch is for the data stored in the cache memory 22, therefore, parallel data exchange is possible between a maximum of four channels Ch and the cache memory 22. At the same time, if the data requested from a channel Ch is not available in the cache memory 22 and the channel ports 12a to 12d are connected with the control interface units 15a, 15b, at most the channel ports of two systems become busy, while the channel ports of the remaining two systems are ready to receive an access request from other channels Ch.

In other words, in spite of the fact that the number of the control interface units 15a, 15b and the cache subordinate or lower-rank paths 29a, 29b of the magnetic disk units 4 is limited in the prior art, in the case where the data associated with an access request is available in the cache memory 22, a high-speed response using the data is possible, thus improving the data throughput between the channels Ch and the magnetic disk units 4.

The access to one or more data in the cache memory 22 through the first transfer route from a given channel is capable of being effected in parallel to the access from other channels Ch to the cache memory 22 or direct access to the magnetic disk units 4, and therefore, the waiting time required for responding to an access request to the magnetic disk units 4 from each channel Ch is decreased for an improved processing capacity of the information processing system as a whole.

In spite of the foregoing specific explanation of the present invention made by the inventors according to embodiments, the present invention is not limited to such embodiments, but is of course variously modifiable within the scope not departing from the spirits of the invention.

Also, channel ports in any other number instead of four may be provided as compared with the control interface control units of two systems for each cluster unlike in the aforementioned embodiments.

Furthermore, the magnetic disk units used as an external memory in the embodiments explained above may be replaced by other type of external memory with equal effect.

We claim:
1. A disk unit control means comprising
a cache memory connected between a host processing unit and disk units comprising an external mem- ory for storing information exchanged with the host processing unit, said cache memory including means for temporarily holding copies of the information stored in the disk units, a plurality of information paths for selectively communicating information among the host processing unit, the cache memory and the external memory, means for controlling the information paths in such a manner that a request from the host processing unit for access to the disk units is applied to the cache memory as far as possible to effect the reading and writing of the requested information between the cache memory and the host processing unit, the plurality of information paths further comprising:

a channel switch circuit connected to a plurality of channels from the host processing unit for accepting an access request from the channels;

a plurality of channel ports selected by the channel switch circuit;

first path means for establishing an information exchange path between the cache memory and each of the channel ports;

second path means for establishing an information exchange path between the disk units and each of the channel ports;

a plurality of third path means for establishing an information exchange path between the cache memory and the disk units, a number of the third path means being smaller than a total number of the first path means;

the disk unit control means further comprising:

a plurality of first control processors provided for the plurality of channel ports respectively for detecting the conditions of the cache memory in response to an access request from a one of the channels and for controlling the selection of the first and second paths by the channel ports;

a plurality of second control processors provided for the third path means respectively for establishing the second and third paths selectively to the disk units; and processor supervisor means for establishing communications between the first and second control processors for establishing independent operation of each control processors and controlling competition between the control processors.

2. The disk unit control means according to claim 1, further comprising interface means inserted between the third path means and the disk units for selecting an information path under a control of the second control processors, and a plurality of data buffer means inserted between the interface means and the second path means for matching a total number of information paths of the third path means with that of the second path means.

3. The disk unit control means according to claim 1, wherein said first and second control processors are microcomputers, and said supervisor means comprises a control memory accessible from the control processors and having a registration area for storing data relating to processing of requests from the processors and a status of each processor, each processor including means for checking for a task to be executed with reference to the data stored in the control memory and, in the presence of a task, executing the task in cooperation with a control processor having the particular task in registration.

* * * * *